US007533120B2

(12) United States Patent
Arrouye et al.

(10) Patent No.: US 7,533,120 B2
(45) Date of Patent: *May 12, 2009

(54) METHOD AND APPARATUS FOR CONFIGURING A COMPUTER

(75) Inventors: Yan Arrouye, Cupertino, CA (US); John Comiskey, San Jose, CA (US); Chris Nebel, Sunnyvale, CA (US); Richard Ford, Arlington, VA (US); Michel Guittet, Redmond, WA (US); Alice Li, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/450,051

(22) Filed: Jun. 9, 2006

(65) Prior Publication Data

US 2006/0242114 A1  Oct. 26, 2006

Related U.S. Application Data

(63) Continuation of application No. 10/405,771, filed on Apr. 1, 2003, now Pat. No. 7,065,533, which is a continuation of application No. 09/863,753, filed on May 22, 2001, now Pat. No. 6,578,042, which is a continuation of application No. 09/074,705, filed on May 8, 1998, now Pat. No. 6,256,635.

(51) Int. Cl.
*G06F 17/30* (2006.01)
(52) U.S. Cl. .................. 707/102; 707/101; 707/104.1
(58) Field of Classification Search ............... 707/1–10, 707/100–104.1
See application file for complete search history.

(56) References Cited

U.S. PATENT DOCUMENTS

| 5,751,972 A | * | 5/1998 | Quinn et al. ................. 709/223 |
| 5,838,907 A | * | 11/1998 | Hansen ....................... 709/220 |
| 5,933,646 A | * | 8/1999 | Hendrickson et al. ........ 717/169 |
| 6,367,073 B2 | * | 4/2002 | Elledge ....................... 717/178 |

* cited by examiner

*Primary Examiner*—Tim T. Vo
*Assistant Examiner*—Sangwoo Ahn
(74) *Attorney, Agent, or Firm*—Hickman Palermo Truong & Becker LLP; Christian A. Nicholes

(57) ABSTRACT

A method and apparatus for configuring a computer. One embodiment of the invention combines all of the prior art control panels related to networking into a consolidated Network Setup Control Panel. In addition, the invention provides for computer configuration by scripting. The configuration may be for a type of system setting or for network configurations and protocols. Through scripting, a computer may be configured locally or remotely on a network. One embodiment of the invention provides for a centralized database or Configuration Library consisting of collected data relating to available configuration settings. This database is not limited to configuration information and can be used as a general database containing information the user desires to store. To modify a configuration by scripting, the invention provides for a Scripting Interface consisting of a Scripting Server and Scripting Plug-In. The Scripting Server receives the script forwarded from a user or network administrator, parses the script and determines the appropriate Scripting Plug-In to forward the desired action to. The Scripting Plug-In receives the commands and executes the appropriate actions to modify the configuration as directed.

30 Claims, 11 Drawing Sheets

NETWORK SETUP CONTROL PANEL, MAIN WINDOW

METHOD AND APPARATUS FOR CONFIGURING A COMPUTER

This application is a continuation application of and claims the benefit of priority from U.S. application Ser. No. 10/405,771, filed on Apr. 1, 2003, now U.S. Pat. No. 7,065,533, 2001, entitled "Method And Apparatus For Configuring A Computer"; which is a continuation of Ser. No. 09/863,753, filed on May 22, 2001, now U.S. Pat. No. 6,578,042; which is a continuation of Ser. No. 09/074,705 filed on May 8, 1998, now U.S. Pat. No. 6,256,635; the entire content of which is incorporated by this reference for all purposes as if fully disclosed herein.

BACKGROUND OF THE INVENTION

1. Field of the Invention

This invention relates to the field of computer software, and, more specifically, to network protocols and configuration.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Apple, Macintosh, AppleTalk, AppleScript, and all Apple-based trademarks and logos are trademarks or registered trademarks of Apple Computer, Inc. in the United States and other countries.

2. Background Art

In modern computing environments, it is commonplace to employ multiple computers or workstations linked together in a network to communicate between, and share data with, network users. A network also may include resources, such as printers, modems, file servers, etc., and may also include services, such as electronic mail.

A network can be a small system that is physically connected by cables (a local area network or "LAN"), or several separate networks can be connected together to form a larger network (a wide area network or "WAN"). Other types of networks include the internet, tel-com networks, the World Wide Web, intranets, extranets, wireless networks, and other networks over which electronic, digital, and/or analog data may be communicated. Individual computers often use various ports to physically connect to a network. For example, if you need to dial into a network using the phone lines and a modem, the modem port may be utilized. Other ports that may be used include a Printer Port, Ethernet, Infrared, and Remote Access.

To enable the computers on a network to communicate with each other, a set of standardized rules for exchanging the information between the computers, referred to as a "protocol", is utilized. Protocols generally specify the data format, timing, sequencing, and error checking of data transmissions. Numerous protocols are used in the networking environment. For example, transmission control protocol/internet protocols ("TCP/IP") are the protocols used on the internet and on many multiplatform networks, and AppleTalk is the network protocol built into every Macintosh computer.

To enable individual computers to utilize a specific protocol, numerous computer settings, including the settings for the desired protocol, must be properly configured. Several software applications for controlling the settings, referred to here as "utilities" may be utilized to control the configuration and modification of a protocol to enable network capabilities. For example, in a Macintosh environment, the following "control panel" user interface utilities may be utilized to configure a computer for various types of network access: AppleTalk, TCP/IP, OT/PPP (Open Transport/Point-to-Point), Infrared, Dial Assist, and Modem. Further, the information and data relating to each protocol are stored independently from other protocols in individual files. These files are accessible to one user at a time. If two users desire to access the configuration file, the first user to open the file with the information is permitted access and the second user is denied access. Some prior art methods permit multiple users to read a file at the same time. However, these methods do not provide any protection for those users should the file be modified by another user while they are reading it.

In some situations, if one of the protocols is configured in a certain manner, one of the other protocols does not operate. For example, if two configurations or devices try and use the same non-sharable port, the user may not be allowed to use the desired port until the conflicting device is deactivated (e.g., a printer can't be activated if it shares the same port as "modem settings"). To deactivate the conflicting device, the user has to search numerous control panels to locate the conflicting device and deactivate or delete the conflicting configuration by adjusting the settings. Thus, the use of an individual control panel for each protocol forces the user to make adjustments and modifications in numerous control panels in order to properly configure the computer. For example, if a user desires to enable multiple networking protocols (e.g., one TCP/IP protocol with a static IP address (IP addresses are discussed below), one TCP/IP protocol with a dynamic IP address, and one AppleTalk protocol), numerous control panels for each protocol must be accessed and configured properly. In addition, if a user desires to connect to the internet, but has a protocol other than TCP/IP active (e.g., AppleTalk), the connection cannot be processed. The user may have to deactivate the active protocol (e.g., AppleTalk) using that protocol's control panel, and then activate the TCP/IP protocol using the TCP/IP control panel.

To route messages and communicate between computers using a TCP/IP protocol, each individual computer must be identified with a unique identifier or address. The unique identifier is referred to as an internet addressor Internet Protocol (IP) address. An individual computer can be assigned a static IP address that does not change. An individual computer can also maintain a dynamic IP address such that whenever it connects to the network, the computer is assigned an IP address. In this manner, each time the individual computer connects to the network, a different IP address may be assigned to the computer.

It is often beyond the scope of the user's knowledge to configure a networking protocol. For example, an employee that solely performs word processing is not likely to have the knowledge to configure his/her computer for network access and operation. Thus, it is desirable for a network administrator to be able to configure a user's computer from the administrator's or another's computer (referred to as "remote configuration").

To enable a computer to execute a sequence of instructions or commands, a computer program is utilized. One type of computer program that provides for the automation of a task or a series of tasks is called a script. A script can be used to perform simple tasks such as a file back-up, or more complex tasks such as adding capability to a program or presentation. A scripting language is used to create a script.

Two common methods are utilized in scripting languages: (1) Event Scripting; and (2) Semantic Scripting. Event scripting consists of mimicking a user's actions and events as they are performed in a user interface. For example, copying the user's actions entailed in moving a mouse over a screen location containing a checkbox for activating sound and depressing the mouse button. Semantic scripting consists of function specific commands that perform specific actions. For example, the execution of a command to activate sound. In the Macintosh environment, one type of semantic scripting language that is often utilized is called AppleScript.

To enable network configuration, one prior art method referred to as "Location Manager") allows users to assign specific settings to a "location" for a variety of capabilities including networking, printers, time zone, file sharing, sound, and frequently used applications. Once a location is set up, a user can select that location and the computer system recognizes the user's preferences for that environment. For example, a home location and an office location may be set up for the various printers and networks available at the user's home and office. However, it is not possible or a network administrator to remotely configure a computer or adjust network settings.

SUMMARY OF THE INVENTION

The invention provides for the configuration of a computer. One embodiment of the invention combines the prior art control panels related to networking into a consolidated Network Setup Control Panel. In addition, the invention provides for computer configuration by scripting. The configuration may be for any type of system setting or for network configurations and protocols. Through scripting, a computer may be configured locally or remotely on a network.

One embodiment of the invention provides for a centralized database consisting of the collected data relating to available configuration settings. This database is not limited to configuration information and can be used as a general database containing any type of information the user desires to store. The database may be accessed by an administrator desiring to configure a computer. When configuring a computer for network accessibility, the database may be modified directly using the Network Setup Control Panel. One embodiment Of the invention provides for modification of the database and computer configuration through scripting.

To modify a configuration by scripting, the invention provides for a Scripting Interface consisting of a Scripting Server and Scripting Plug-in. The Scripting Server is programmed with the general knowledge of the structure and type of objects representing configuration stored in the database. The Scripting Server receives the script forwarded from a user or network administrator, parses the script and determines the appropriate Scripting Plug-In to forward the desired action to (by accessing the general knowledge the Scripting Server maintains). The Scripting Plug-in is programmed to maintain knowledge of the specific fields and methods of the objects stored in the database. Thus, the Scripting Plug-In receives the commands and executes the appropriate actions to modify the configuration as directed.

To create a script, one embodiment of the invention provides for the use of a dictionary containing available commands and objects that may be modified. After creating a script, the administrator merely executes the script on a copy of the Scripting Server that is run either remotely or locally. In this manner, a computer may be configured using scripting.

In addition, one embodiment of the invention provides for backwards compatibility with prior art configuration settings (using the file formats that existed in the prior art). The backwards compatibility method includes exporting and importing various configuration settings into the consolidated database.

DETAILED DESCRIPTIONI OF THE INVENTION

The invention is a method and apparatus for configuring a computer. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Embodiment of Computer Execution Environment (Hardware)

Figure 1:
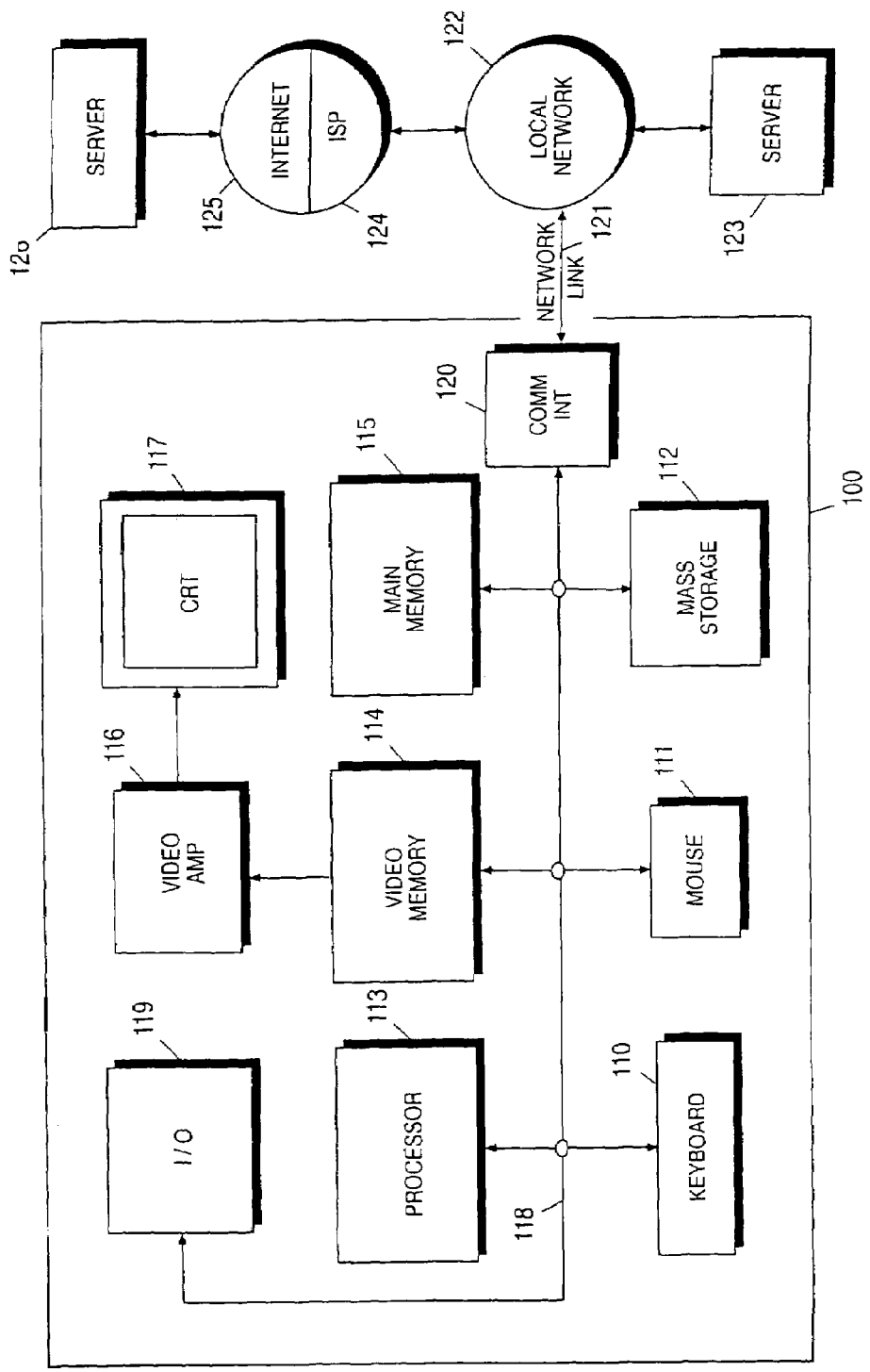
FIG. 1 is a block diagram of one embodiment of a computer system capable of providing a suitable execution environment for an embodiment of the invention.

An embodiment of the invention can be implemented as computer software in the form of computer readable code executed on a general purpose computer such as computer 100 illustrated in FIG. 1, or in the form of bytecode class files running on such a computer. A keyboard 110 and mouse 111 are coupled to a bi-directional system bus 118. The keyboard and mouse are for introducing user input to the computer system and communicating that user-input to processor 113. Other suitable input devices may be used in addition to, or in place of, the mouse 111 and keyboard 110. I/O (input/output) unit 119 coupled to bi-directional system bus 118 represents such I/O elements as a printer, A/V (audio/video) I/O, etc.

Computer 100 includes a video memory 114, main memory 115 and mass storage 112, all coupled to bi-directional system bus 118 along with keyboard 110, mouse 111 and processor 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as processor 113, main memory 115, video memory 114 and mass storage 112. Alternatively, multiplex data/address lines may be used instead of separate data and address lines.

In one embodiment of the invention, the processor 113 is a microprocessor manufactured by Motorola, such as the 680X0 processor or a microprocessor manufactured by Intel, such as the 80X86, or Pentium processor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to local server computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, remote server computer 12b might transmit a requested code for an application program through Internet 125, ISP 124, local network 122 and communication interface 120. In accord with the invention, one such application is that of remotely configuring a computer.

The received code may be executed by processor 113 as it is received, and/or stored in mass storage 112, or other non-volatile storage for later execution. In this manner, computer 100 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Utilization of Computer Software

As indicated in the background, control panels may contain multiple related functions and data structures. To encapsulate these related functions and data structures, one embodiment of the invention utilizes a standard object oriented programming (OOP) language approach. To provide an understanding of encapsulation of related data structures and methods, an overview of object-oriented programming is provided below.

Object-Oriented Programming

Object-oriented programming is a method of creating computer programs by combining certain fundamental building blocks, and creating relationships among and between the building blocks. The building blocks in object-oriented programming systems are called "objects." An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214-223.

A class defines a type of object that typically includes both variables and methods for the class. An object class is used to create a particular instance of an object. An instance of an object class includes the variables and methods defined for the class. Multiple instances of the same class can be created from an object class. Each instance that is created from the object class is said to be of the same type or class.

To illustrate, an employee object class can include "name" and "salary" instance variables and a "set_salary" method. Instances of the employee object class can be created, or instantiated for each employee in an organization. Each object instance is said to be of type "employee." Each employee object instance includes "name" and "salary instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

A hierarchy of classes can be defined such that an object class definition has one or more subclasses. A subclass inherits its parent's (and grandparent's etc.) definition. Each subclass in the hierarchy may add to or modify the behavior specified by its parent class. Some object-oriented programming languages support multiple inheritance where a subclass may inherit a class definition from more than one parent class. Other programming languages support only single inheritance, where a subclass is limited to inheriting the class definition of only one parent class.

An object is a generic term that is used in the object-oriented programming environment to refer to a module that contains related code and variables. A software application can be written using an object-oriented programming language whereby the program's functionality is implemented using objects. The encapsulation provided by objects in an object-oriented programming environment may be extended to the notion of control panels and representations of the control panel configurations stored in a database.

Embodiment of Software Apparatus for Configuring a Computer

One embodiment of the invention provides for the ability to easily and remotely configure a computer for network accessibility. The multiple control panels that are used in the prior art to properly configure a computer are consolidated into one Network Control Panel that allows the configuration of the various protocols that the computer operating system supports. To provide for one Network Control Panel, the present invention implements several unique features.

One embodiment of the invention provides for a centralized database that remains persistent on the computer that consists of the collected data relating to available configuration settings. This database is not limited to configuration information and can be used as a general database containing information the user desires to store. The database may be accessed by an administrator desiring to configure any computer.

The consolidated database provides advantages and features not available in the prior art. Some of these advantages include: (1) A combined uniform database containing a collection of the incompatible file formats for the individual configurations; (2) The database may be viewed and read by multiple readers and may be modified by one user or writer concurrently (the embodiment provides protection for the readers when the database is modified by a writer); (3) The database maintains crash protection; (4) The database is capable of receiving remote commands or remote scripting; (5) The database maintains backwards compatibility with prior art file formats; and (6) The database supports a unified mechanism for sorting and sifting files by protocol type.

Centralized Database Features

Incompatible File Formats

Existing network configurations are stored in primarily two types of incompatible file formats: (1) A format that supports multiple configurations; and (2) a format that does not support multiple configurations. A format that supports multiple configurations allows multiple configurations of the same type to be configured and saved at the same time (e.g., the user may configure and store several TCP/IP protocols at the same time). A format that does not support multiple configurations only permits one type of each protocol to be active and stored at a time. If the user desires to change or modify the active configuration, the user may do so, but the prior settings cannot be stored or saved (only the modified version is stored and remains active) (e.g., the user may only have one Infrared Configuration active or stored on a computer at any one time). To combine the configurations into a centralized database, these incompatible formats have to be reconciled.

Figure 5:
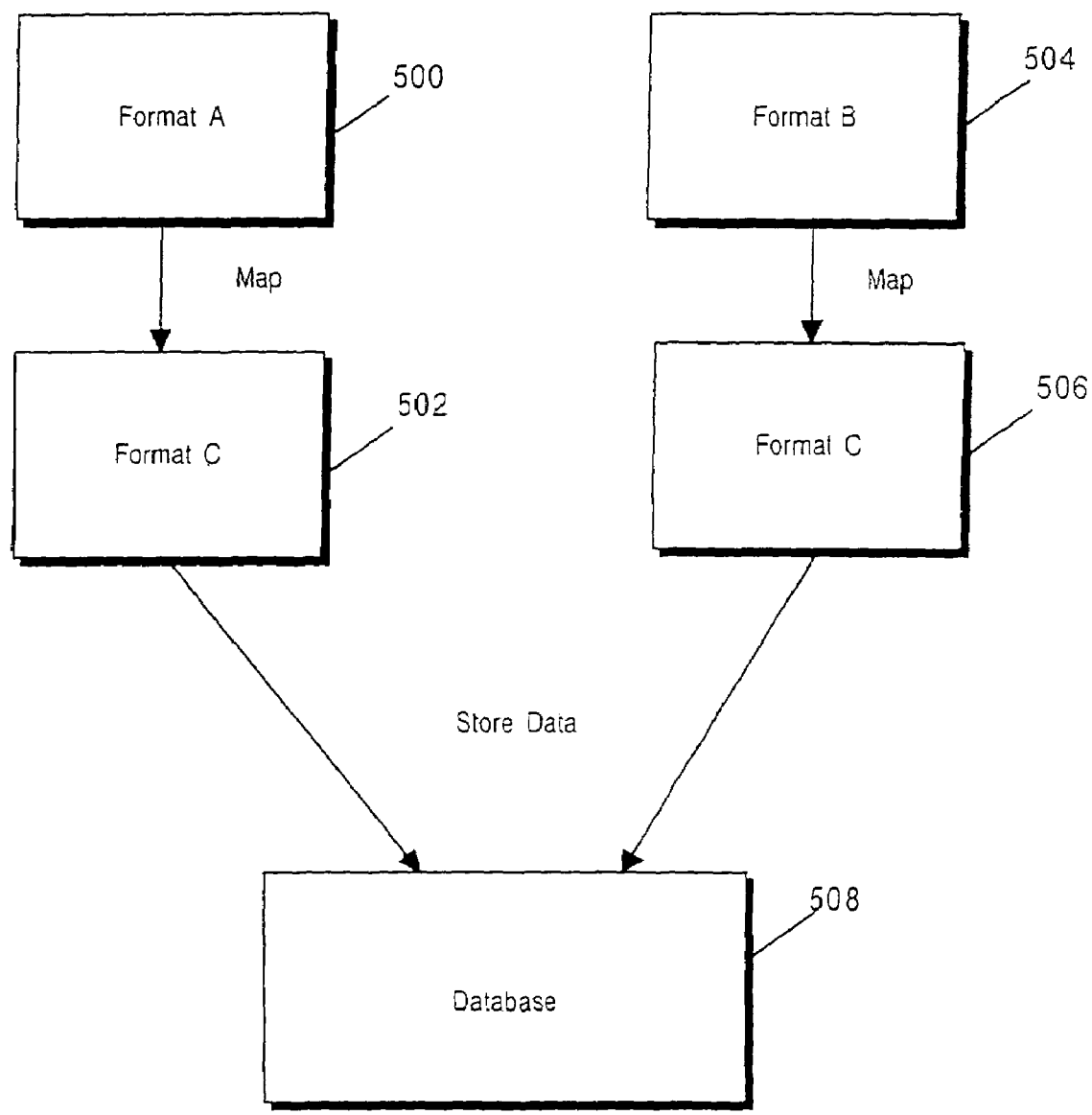
FIG. 5 illustrates the file mapping used to combine incompatible file formats of one embodiment of the invention.

To create a consolidated database, each file data format of the prior art is mapped into a new data format. The new mapped data from each type of format may then be stored together in one uniform database. FIG. 5 demonstrates the mapping used to create a consolidated database. Format A 500 supports multiple configurations (but may only allow one configuration to be activated at a time). Format B 504 does not support multiple configurations at all. Both Format A 500 and Format B 504 are imported or mapped into a compatible Format C 502 and 506 respectively. The imported configurations 502 and 506 may then be stored in the Database 508.

One embodiment of the invention provides an additional feature that converts formats that do not support multiple configurations into a format that supports multiple configurations while maintaining the integrity of the file format. This feature is provided by importing the non-multiple configuration files into the database. The database allows multiple configurations to be used and provides for one of the configurations to maintain "active" status. When the database is closed, the "active" configuration is exported and saved to the non-multiple file format. Thus, the database maintains the integrity of the file formats that supports multiple configurations while simultaneously supporting multiple formats on the computer system.

A more detailed description of the consolidation of the incompatible file formats and the non-multiple file format support is explained below.

Multiple Concurrent Access Capability

Figure 2:
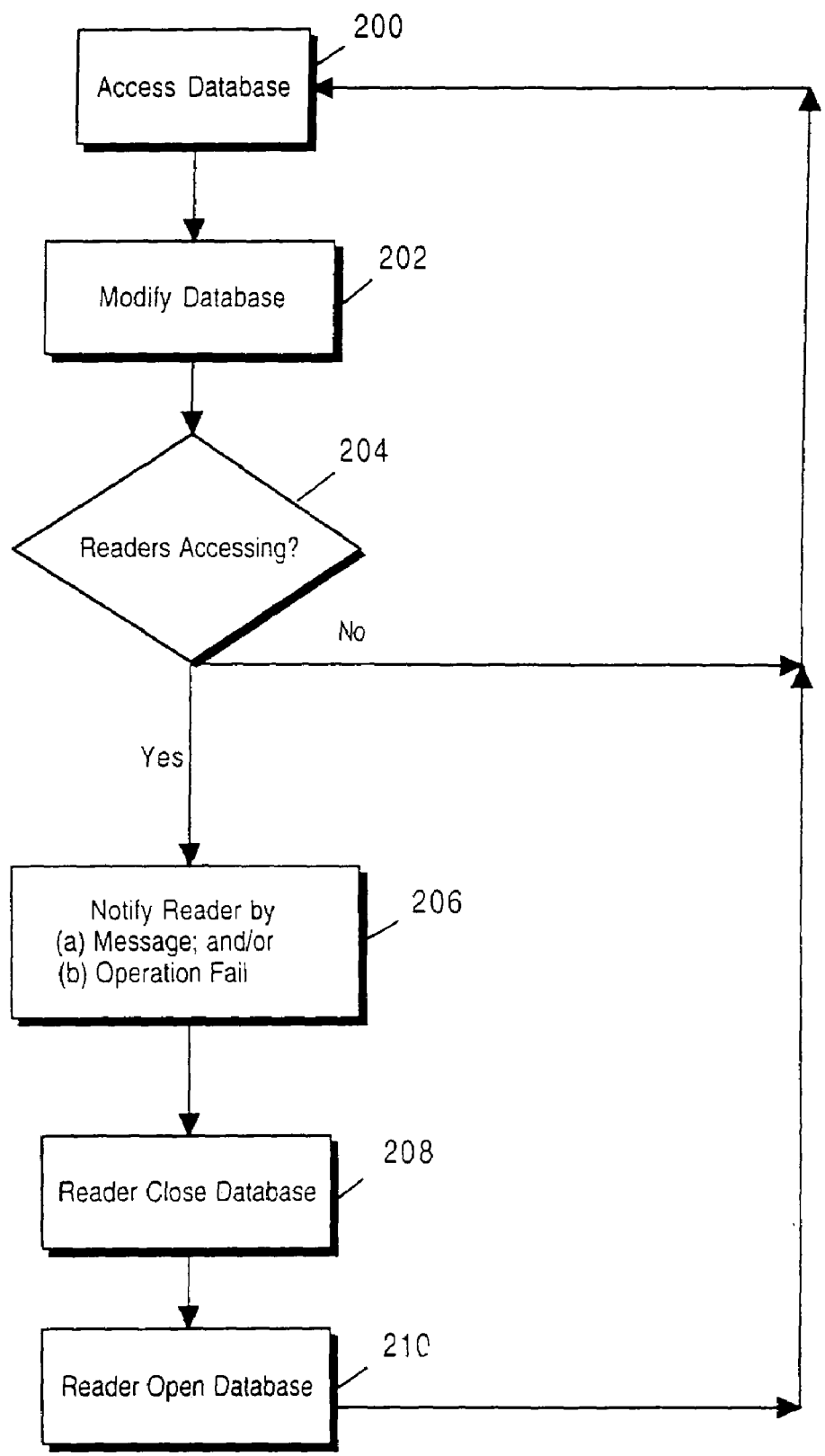
FIG. 2 illustrates the multiple reader protection provided by one embodiment of the invention.

One embodiment of the invention provides the ability for multiple users to access the database concurrently. FIG. 2 illustrates a method of one embodiment that provides for multiple concurrent readers of the database to access the most recent and updated version of the database. At step 200, multiple users access the database at any one time. At step 202, one of the users modifies the database by writing (also referred to as recording or "committing any changes to the database file. During this write transaction, the database is locked so that no other users may modify the database. At step 204, a determination is made regarding whether multiple users were accessing the database when the database was modified. If multiple users were Mt accessing the database during the modification, the process starts over and the user that modified the database (the "writer") is allowed to continue accessing with other users ("readers").

If multiple users were accessing the database when the modification was made, the remaining users are notified of the modification at step 206. The notification consists of a message being transmitted to the user and if any operation is attempted on the database by the user, the operation fails. For the user to complete any database operation and access the modified version of the database, the database file must be closed at step 208. At step 210, the database file is reopened in its modified form. In this manner, any program that is accessing the database file does not need to be restarted or exited. The database file being accessed by the program merely needs to be closed and reopened. Subsequently, users may access the database as if no change had been made at step 200.

One embodiment of the invention implements the "write" procedure indicated above through various steps. When accessing the database, a duplicate copy of the information being viewed (e.g., a configuration set or protocol) is copied into a temporary location. Any modifications that are made prior to being committed are made to the temporary file. Once the writer desires to commit any changes, the temporary file is marked as "committed" (or alternatively, a duplicate of the temporary file is created and labeled as "committed") and the original information is replaced with the modified permanent information. Eventually the "committed" file copies may be deleted.

Database Crash Protection/Recovery

One embodiment of the invention provides the ability to maintain and protect the database if a system failure occurs (i.e., when the computer must be restarted or unexpectedly quits the application) while the user is attempting to commit modified information to the database. A Configuration Library that includes code to maintain and modify the database may provide this ability. Prior to committing information to the database, a flag is set indicating that the information being modified has not yet been "committed" to the database. Subsequent to committing the information, the flag is set indicating that the "commit" operation has occurred. In the event of a system failure, the lock that is placed on the database during a "write" transaction is released (thus enabling others to access and write to the database if needed).

The next time a user tries to access the database, it can be determined if the modified information was committed by checking the flag. If the flag indicates that a "commit" operation has occurred, the user knows that the information was recorded and access may continue as normal. If the committed flag indicates that the "commit" has not yet occurred, the data that has not been committed is deleted and the user must restart the modification process. In this manner the integrity of the database is maintained even in the event of a system failure.

Remote Commands/Remote Scripting

One embodiment of the invention provides the ability to perform remote scripting. Remote scripting allows an administrator to set up a script on the administrator's computer to perform a plurality of events sequentially on the administrator's computer or on a computer connected to the network. In addition, a script can be stored remotely and an administrator or user may command the script to run. The ability to run a script to perform a plurality of events on the network enables a network administrator to automatically custom configure each network user's computer from a remote location. This capability eliminates the need to physically and manually adjust each computer that is connected to the network. If a network contains several hundred computers and each has a static IP address that needs to be changed, the network administrator saves considerable time by merely creating a script to adjust the IP address on each user's computer. This also prevents possible errors if each computer user were required to manually adjust the computer's configuration.

The ability to perform remote scripting and the mechanisms that provide for scripting are discussed in detail below.

Mechanism for Sorting Database Information

Traditional databases may be accessible using two components: a key and a value. For example, in a database of employees, the key may titled NAME, and a Value for any one record in the database may be the name of an employee such as John Smith. Various other keys may also be utilized such as ADDRESS, DEPARTMENT, and SALARY. Database accessibility using keyvalue pairs is more fully described in pending U.S. patent application Ser. No. 08/863,416 entitled "Dynamic Object Communication Protocol".

Figure 10:
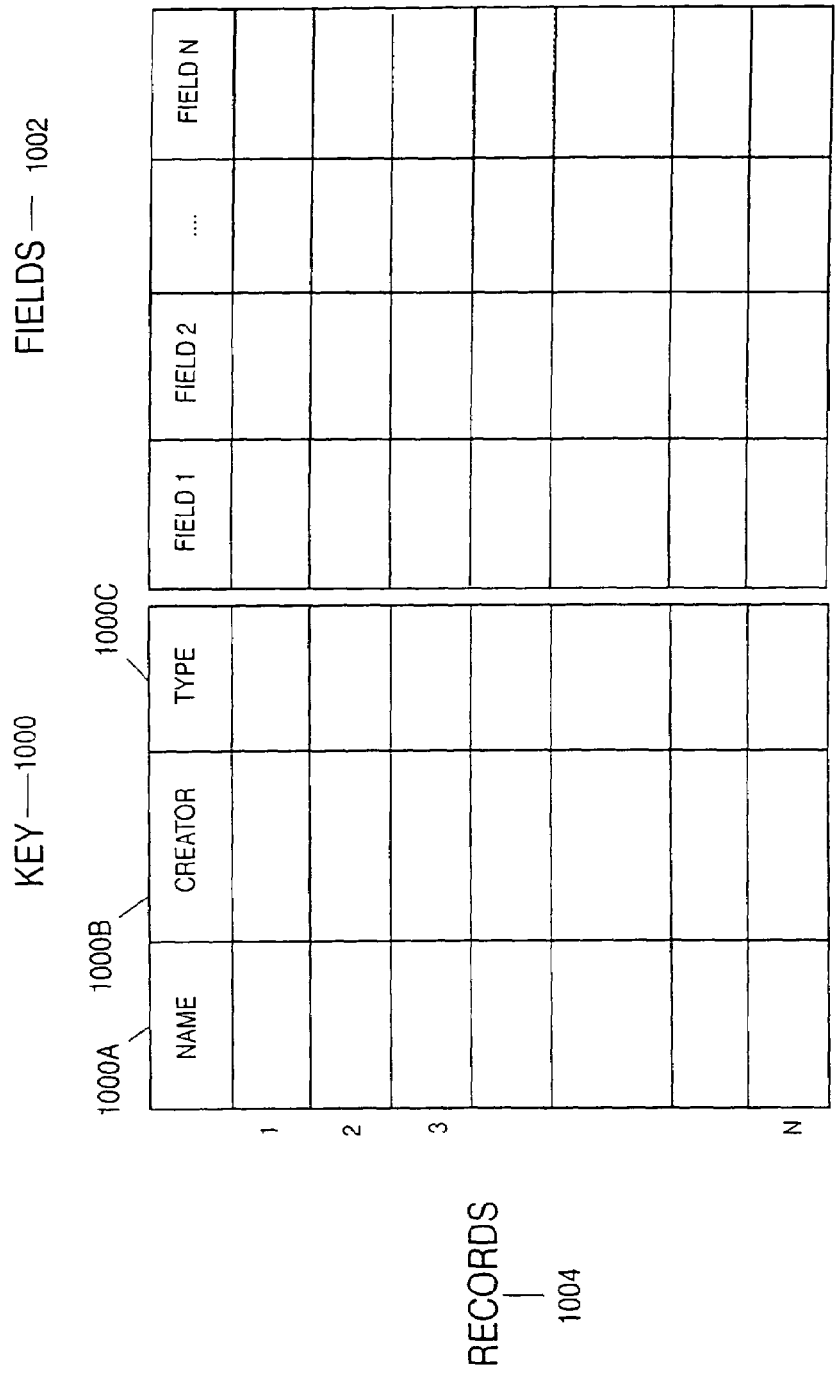
FIG. 10 demonstrates a database of one embodiment of the invention.

Referring to FIG. 10, one embodiment of the invention provides for the database 1006 to be accessible using a three-part key 1000 consisting of NAME 1000a, CREATOR 1000b, and TYPE 1000c. Each record 1004 in the database has a NAME 1000a associated with it, the name of the CREATOR 1000b of the record, and the TYPE 1000c of record. Further, an arbitrary amount of data 1002 may stored in each record. For example, in a database of employees, the three-part key for each record consists of the NAME of an employee, the name of the CREATOR of that record, and the TYPE of record (e.g., an employment record.). Using the database in a network configuration environment, the key would consist of the NAME of the configuration, the CREATOR of the configuration, and the TYPE of configuration such as AppleTalk or TCP/IP and each record comprises a configuration. Using the three part key, the configurations may be sorted by either the NAME of the configuration, the CREATOR of the configuration or the TYPE of configuration. In addition, the user can elect to only view configurations of a specific TYPE.

System Configuration

To utilize the database to configure a computer system or the network configuration on a computer, various utilities or clients are needed. One embodiment of the invention provides for a user interface client and a scripting interface client.

Figure 11:
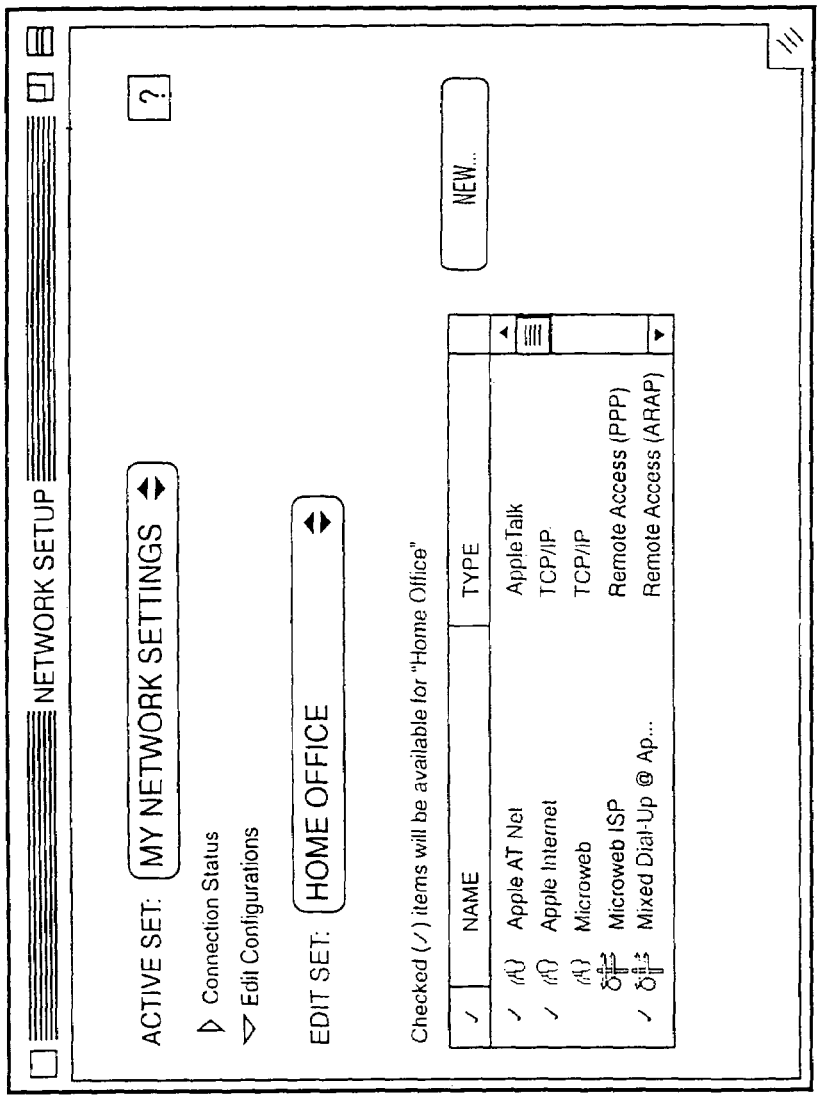
FIG. 11 is a screen print-out of a combined Network Setup Control Panel of one embodiment of the invention.

The User Interface client consolidates all of the existing control panels into one combined Network Setup control panel as demonstrated by a screen print out of the Network Setup Control Panel of one embodiment in FIG. 11. With a consolidated control panel, the user does not need to adjust multiple control panels for existing protocols such as the TCP/IP control panel and the PPP control panel. The user need only use the one control panel to adjust all networking capabilities. Further, by consolidating the control panels, the configuration or other settings may be checked at the time of set-up to ensure that the protocols are compatible (the prior art only detects incompatibility at the time of execution or use).

User Interface Client

The user interface permits two protocols of the same type to be created and active at the same time, referred to as multihoming. Multihoming is beneficial when a user has multiple networks connected and being used simultaneously. For example, if the user has a network within the user's company (called an intranet) through two different ethernets, multihoming allows the user to use two AppleTalk protocols at the same time to permit access through both ethernet connections. Through multihoming the invention provides for the activation of multiple networks to be active simultaneously. Another example of multihoming consists of two TCP/IP configurations active at the same time which thereby provides the ability to have a static IP address and dynamic IP address on the same computer active at the same time.

Scripting Interface Client

The Scripting Interface is a general tool that can be used to access the database (remotely or locally) or configure a user's computer system (remotely or locally) (including system settings other than network configurations).

The Scripting Interface consists of two components: (1) an Application Program or Scripting Server; and (2) Personality Module or Scripting Plug-In. By adding various scripting Plug-Ins to the Scripting Server, the Scripting Interface may be customized for particular purposes. For example, in one embodiment of the invention, the Scripting Interface may be customized into a Network Scripting Interface.

Scripting Server

The Scripting Server component of the Scripting Interface acts as an engine.—When commands to perform an action are transmitted to the Scripting Interface, the Scripting Server receives the commands. In one embodiment, the commands are transmitted in the form of a script.

In addition to AppleScript, in the Macintosh environment, the Scripting Server may accept AppleEvents. An AppleEvent provides for communication between applications by allowing an application to send a command to another application. The Scripting Server component of the Scripting Interface may be used to receive either AppleScript or AppleEvents. ability is enabled by utilization of a dictionary (encompassed within a configuration library that is invoked when the user desires to access the database) that describes recognizable script events, and the objects and their relationships as they exist in the database. In one embodiment, the dictionary consists of the standard dictionary utilized in AppleScript and any extended capabilities added by a scripting language programmer. To adequately enable the Scripting Server, the dictionary must contain a class for each object or item that may be configured (e.g., the dictionary must contain a class for each protocol such as TCP/IP, AppleTalk, etc.). Further, if a particular configuration is expanded and is capable of handling additional features, the dictionary and Plug-In must be modified to accommodate the new features. The following is an example of part of a dictionary:

```
begin transaction: Begin a transaction
    begin transaction
    Result: integer -- the transaction id number
end transaction: End a transaction. Any changes will be saved.
    end transaction
abort transaction: Abort this transaction. Any changes will be discarded.
    abort transaction
authenticate: Authenticate access to an object
    authenticate reference -- the object to authenticate
        with password string -- the password to authenticate it
with
Result: booiean -- the result of the authentication
get protection: Get the protection of a property
    get protection reference -- the property to examine
    Result: locked/unlocked
set protection: Set the protection of a property. You must have
administration access to do this.
    set protection reference -- the property to lock or unlock
        to locked/unlocked
add: Add an object to a configuration set. An object may belong
to any number of sets.
    add reference -- the configuration or transport options to add
        to configuration set -- the configuration set to add it to
remove: Remove an object from a configuration set. This does
not delete the object.
    remove reference -- the configuration or transport options to remove
        from configuration set -- the configuration set to remove it
from
Class configuration: An Open Transport configuration. This is
an abstract class —to make a configuration, make one of the
sub-classes listed below.
Plural form:
    configurations
Properties:
    name string -- the name of this configuration
    active boolean -- is this configuration active
    validity boolean [r/o] -- validity of this configuration
Class configuration set: An Open Transport configuration set
Plural form:
    configuration sets
Elements:
    configuration by name, by numeric index, satisfying a test,
as a range of elements
    transport options by name, by numeric index, satisfying a test,
as a range of elements
Properties:
    name string -- the name of this configuration set
    active boolean -- is this the active set?
```

```
-continued

Class transport options: Options that apply to all configurations
of the same class. This is an abstract class —to make an
options object, make one of the subclasses listed below.
Properties:
    name string -- the name of this options
    active boolean -- are these options active?
    consequence benign/may affect services/must restart
configuration/must restart protocol/must restart machine
[r/o] -- consequence of changes to this options's settings
    validity boolean [r/o] -- validity of this options
Class AppleTalk configuration: An AppleTalk configuration Plural form:
    AppleTalk configurations Properties:
        <inheritance> configuration         inherits the properties and
elements of an Open Transport configuration
        addressing dynamic/static -- the addressing scheme of this
configuration, -- may be locked
        AppleTalk zone string -- the zone of this configuration, -- may
        be locked
        network ID integer -- the network ID of this configuration, -- may
        be locked
        node ID integer -- the node ID of this configuration, -- may be locked
        port modem port/printer port/modem printer
port/Ethernet/a string           -- port of this configuration, -- may be locked
        protocol AppleTalk [r/o] -- protocol of this configuration
        administration password string -- password of this
configuration
        user mode basic/advanced/administration -- user mode of
this configuration
Class AppleTalk options: The AppleTalk options Plural form:
    AppleTalk transports Properties:
        <inheritance> transport options -- inherits the properties and
elements of an Open Transport options
    unload delay integer -- unload delay of these options
```

In this manner, the Scripting Server component is configured to maintain knowledge of the general structure and capabilities of the database. However, the Scripting Server does not maintain any knowledge about particular fields that are in the classes. Based on its knowledge of the database, the Scripting Server interprets the commands and determines the type of object that the desired action is to be performed on. Once determining the appropriate object, the Scripting Server forwards the commands to the appropriate Scripting Plug-In that has the ability to modify the object.

Scripting Plug-In

The Scripting Plug-In receives parsed commands from the Scripting Server. Since the Scripting Server is specific to a particular object or type of configuration, it maintains knowledge of the individual fields, data structures, and methods of each type of configuration, class, or object. Consequently, when the command is received from the Scripting Server, the Scripting Plug-In is able to utilize the necessary method to manipulate the field in the database and perform the desired operation or command. Each Plug-In maintains the knowledge of the desired classes to manipulate the field as necessary. For example, a TCP Plug-In maintains the necessary knowledge to modify any fields in a TCP configuration. Similarly, an AppleTalk Plug-In maintains the necessary information to modify any fields in an AppleTalk Configuration. Further, to ensure that each Plug-In is only operating on fields in the appropriate configuration, the sorting and sifting capabilities of the database described above are used.

In one embodiment the configuration settings that the Scripting PlugIn maintains knowledge about include two parts: (1) Global Settings (referred to as Globals); and (2) Configuration Settings. Global settings are those settings that are not dependent on the type of configuration and do not change from configuration to configuration. In one embodiment, both Global Settings and Configuration Settings are implemented in an object oriented programming language as abstract classes. An abstract class is a class that contains functions that are declared but not implemented. In other words, an abstract class merely declares its existence and a subclass (a class that inherits or descends from the another class) must implement the abstract methods and protocol specific fields and accessors. For example, in one embodiment the abstract methods that must be implemented are:

(1) .ReadSettings: to initialize the object from an entity;
(2) WriteSettings: to write the object into an entity; and
(3) Clone: to clone the object.

Further, a "protocol proxy" object that encapsulates all of the protocol data and behavior must be implemented. The protocol proxy responsible for:

(1) Reading all of the protocol entities from an area (such as the database) and creating corresponding Configuration Settings objects;
(2) Validating the data;
(3) Interacting with the stack to check the consequences of a new configuration and reconfigure the stack; and
(4) Provide the appropriate Control Panel classes to edit the protocol Global Settings and other settings.

If any change in the system settings are made as a result of the operation, the Scripting Plug-In notifies the operating systerr . . . software so that the changes are recognized by the system.

Figure 3:
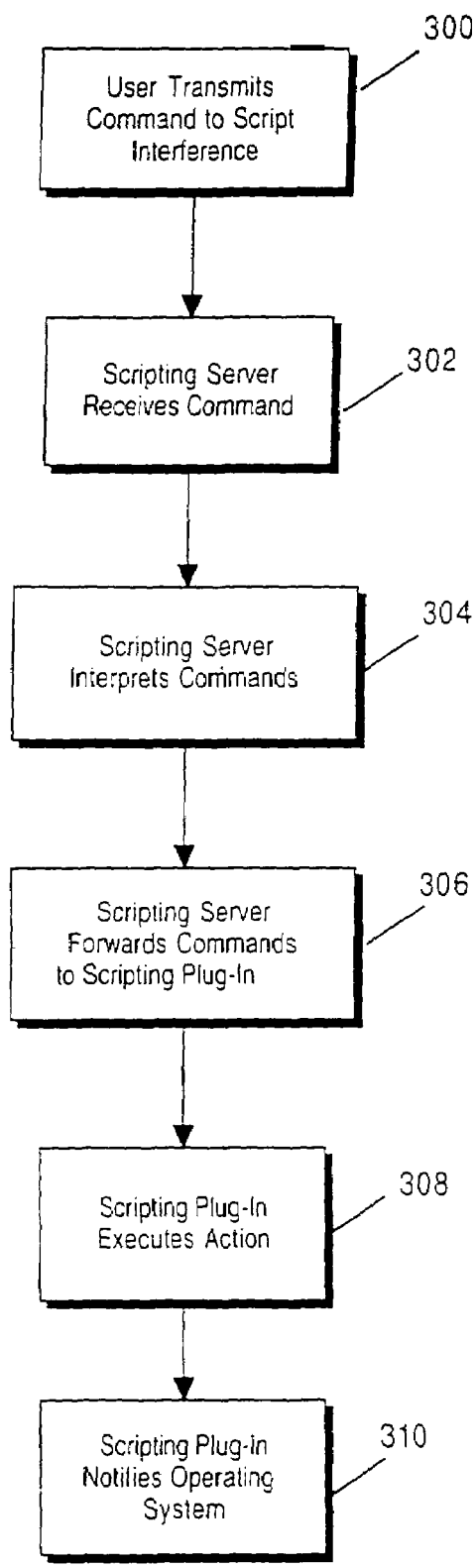
FIG. 3 illustrates the method of processing scripts provided by one embodiment of the invention.

FIG. 3 illustrates the interaction between the Scripting Server component and Scripting Plug-In component of the Scripting Interface. At step 300, the user or application transmits a command to the Scripting Interface. This command may be from a local script on the user's machine, from a remote script from a machine somewhere on the network, or from a remote process running on a machine somewhere on the network. At step 302, the Scripting Server receives the command. At step 304, the Scripting Server interprets the command. The interpretation process consists of the Scripting Server parsing the command and determining the type of object that the command is to be executed by or on. At step 306, the Scripting Server forwards the command to the appropriate Scripting Plug-In (which is customized for the particular type of object that is to perform the command). At step 308, the Scripting Plug-In performs the desired action. At step 310, the Scripting Plug-In notifies the operating system software of any system settings that have changed.

Figure 4A:
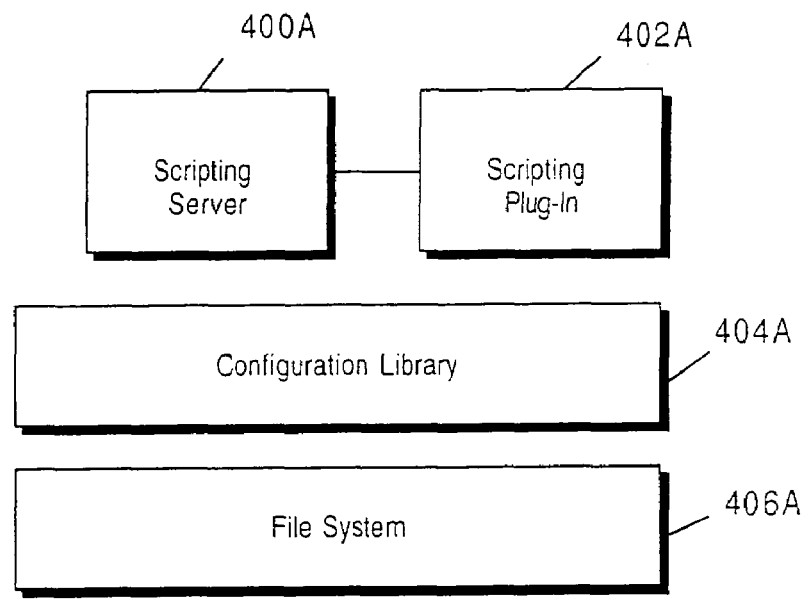
FIG. 4a demonstrates the architectural design of one embodiment of the invention.

FIG. 4a illustrates the architectural design of one embodiment of the invention. File system 406a contains the general file structure available on computer systems and the database of configurations. The Configuration Library 404a provides the necessary software, configuration information, protocol information, and dictionary for use by the scripting interface to access and modify the database in the file system 404a. Scripting Server 400a receives the commands and determines the appropriate Scripting Plug-In 402a to forward the command to by examining Configuration Library 404a.

Figure 4B:
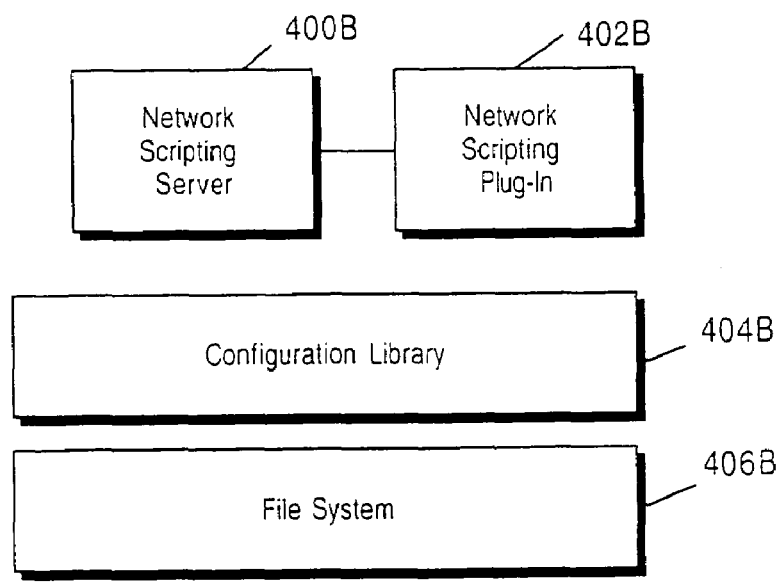
FIG. 4b demonstrates the architectural design of FIG. 4a customized for network configuration of one embodiment of the invention

FIG. 4b illustrates an architectural design of an embodiment for network configuration. The Configuration Library 404b contains network configuration specific information to enable access to the database. Network Scripting Server 400b receives the commands, interprets them and forwards them to the appropriate Network Scripting Plug-In 402b to modify the desired type of protocol (e.g., AppleTalk, TCP/IP, etc.) in the database.

In addition to utilizing the Scripting Server 400 to access the database, the database may be accessed and modified directly by any user. However, by accessing and modifying the database directly, errors are more likely to occur than through utilization of the Scripting Server 400 and Configuration Library 404.

In one embodiment of the invention, the creator of a particular Plug-In only needs to create a dictionary as described above (and may omit any code that provides support for the classes in the dictionary). The dictionary specifies that each particular class in the dictionary inherits from a predefined class (such as an AppleEventRecord (a Record containing AppleEvents)). In such an embodiment, the Scripting Server encapsulates the fields that have been defined in the dictionary into an AppleEventRecord and writes the encapsulated information to the database. The Scripting Server must maintain knowledge of how to support the predefined class (e.g., an AppleEventRecord). In this manner, the objects and configurations in the dictionary appear in the database through an interaction with the Scripting Server.

In addition to the above configurations illustrated in FIG. 4, one embodiment of the invention continues to provide support for the Location Manager such that if the user desires to switch locations, the Location Manager may be continue to be used as in the prior art.

OT Configuration Library

Figure 6:
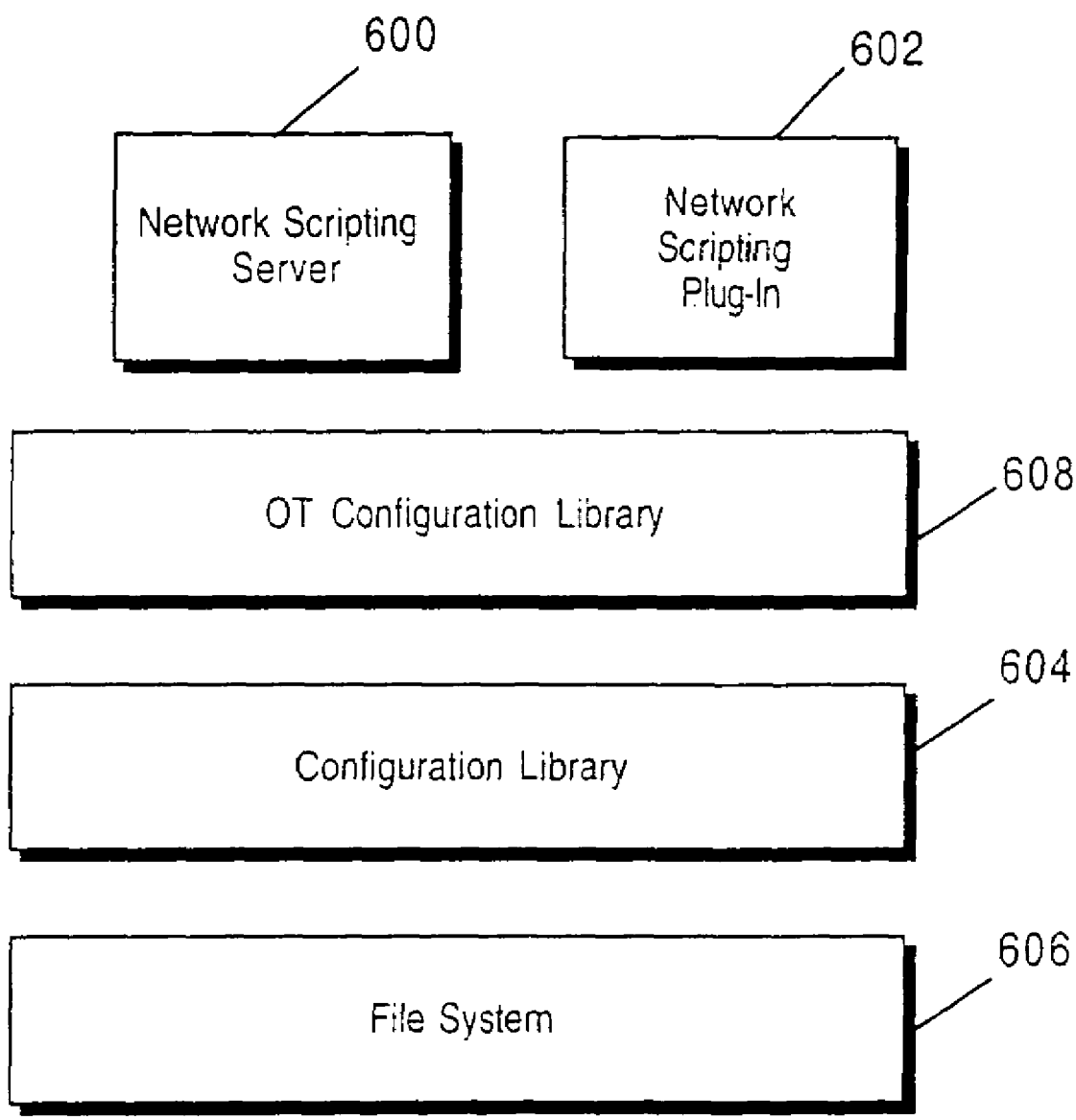
FIG. 6 demonstrates the architectural design of FIG. 4b customized with an additional library to enable additional features of one embodiment of the invention.

The database and methods described above provide for data protection, crash recovery, sorting and sifting of items by protocol type, and a method for creating, accessing, and modifying the data. One embodiment of the invention provides for an additional Configuration Library that supports a broader set of capabilities specific to Network Configuration. FIG. 6 illustrates the architectural design of such an embodiment. Similar to the design described in FIG. 4b, the underlying File system and database 606, Network Scripting Server 600, Network Scripting Plug-In 602, and Configuration Library 604 remain intact. In addition, an OpenTransport (OT) (type of network software product manufactured by Apple Computer, Inc.) or Network Configuration Library 608 layer is added to the design. The OT Configuration Library 608 provides backwards compatibility such that all computer systems, old and new have the ability to support multiple configurations. This layer of the architectural design may be created and used for any type of configuration that requires backwards compatibility. The layer need not be specific to network configuration.

Figure 7:
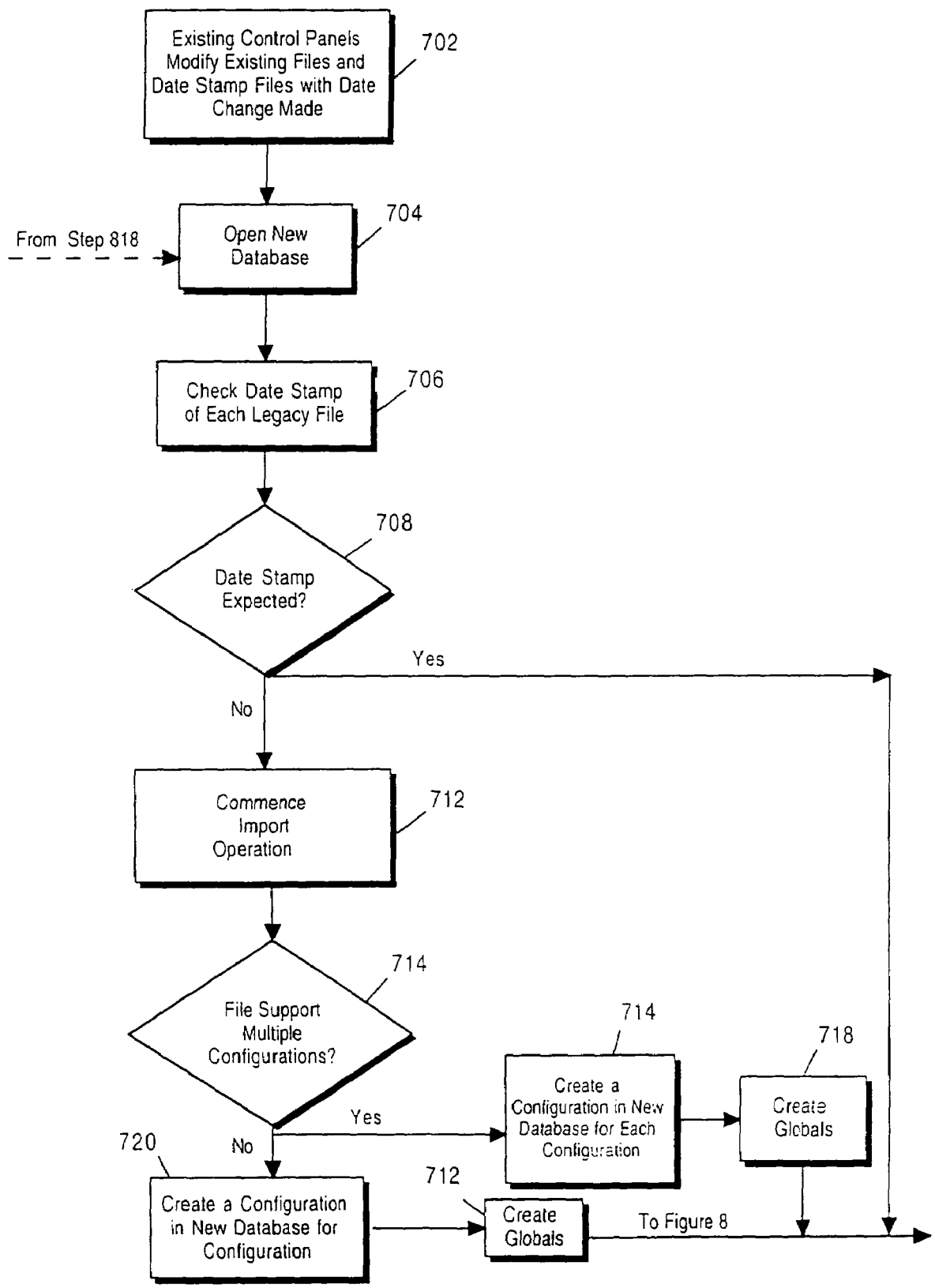
FIGS. 7 and 8 illustrate a method for enabling backwards compatibility with prior art file formats provided by one embodiment of the invention.
Figure 8:
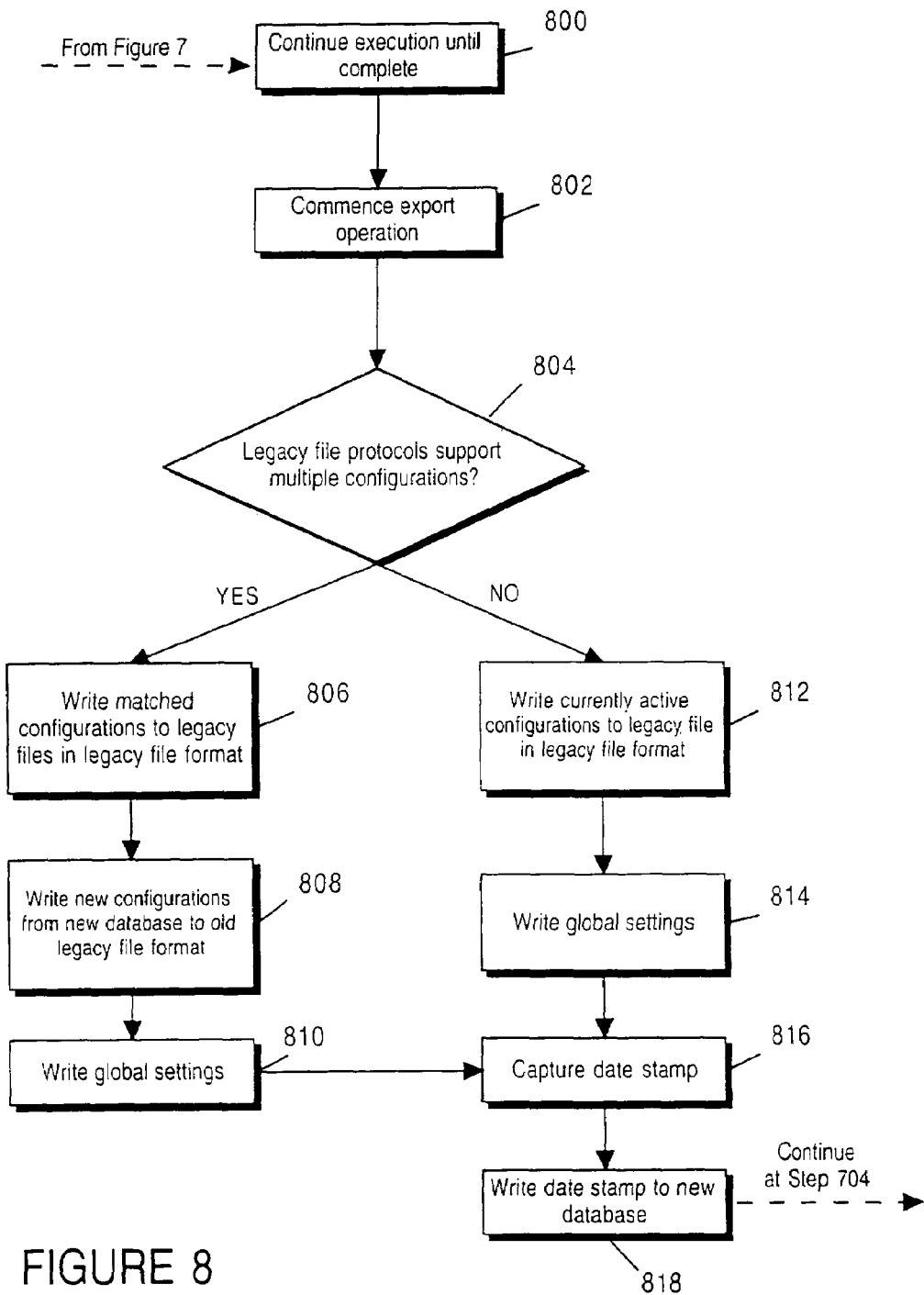

The backwards compatibility feature is enabled through an automated import-export feature that occurs transparently to the user. FIGS. 7 and 8 illustrate this import-export feature. The prior art control panels modify their respective files (referred to as legacy files) when a change is made. Each time a change is made to a legacy file, the legacy file is date stamped with the date and time the change is made at step 702. The new database containing the consolidated information from the prior art control panels is opened or accessed by the Scripting Server or Scripting Plug-In at step 704. At step 706, the date stamp of each legacy file represented in the database is checked. If the date stamp matches the date stamp set in the database, execution continues normally as indicated in FIG. 8 (see below).

If the date stamp of a legacy file does not match the date stamp expected in the database, an import operation commences at step 712. A determination regarding the type of configuration that is stored in the legacy file is made at step 714. If the configuration in the legacy file supports multiple configurations, a configuration for each of the multiple configurations in the legacy file is made in the new database at step 716. Additionally, a set of globals are created in the new database at step 718. Thus, if there are n configurations in the legacy file, n+1 entries are created in the new database (one for each configuration+a set of globals).

If the legacy file does not support multiple configurations, a configuration for the legacy file configuration is created in the new database at step 720. In, addition, a set of globals are created at step 722. By importing the legacy file configuration into the new database, the user is given the opportunity to create an additional instance of the current configuration with slightly different settings. This opportunity essentially converts the non-multiple configuration legacy files into a system that supports multiple configurations.

Referring to FIG. 8, execution of the desired action continues until completion (often symbolized by the close of the new database) at step 800. When the user ends his/her transaction (by completing the "write" operation on the database), an export operation commences at step 802. A determination is made as to whether the legacy files support multiple configurations at step 804. If the legacy files support multiple configurations, the configurations in the new database are matched up with the appropriate legacy files and the configurations in the database are written to the legacy files in the old legacy file format at step 806. At step 808, any new configurations in the database that do not have corresponding legacy files (i.e., newly created configurations) are writ-ten to an existing or newly created legacy file in the old legacy file format. At step 810, the global settings from the new database are written to the legacy files. The date stamp indicating the date and time the legacy file was just modified is captured at step 816 and recorded in the database at step 818.

If the legacy files do not support multiple configurations (as determined at step 804), the currently active configuration is written to the legacy file in the old legacy file format at step 812. By only writing the currently active configuration to the legacy file, the old file format (which only supports one configuration at a time) is preserved while at the same time the new database continues to provide support for multiple configurations. To change the currently active configuration in the legacy file, the user simply designates a new active configuration in the database which starts the import-export procedure (the import-export procedure commences because a change in a configuration causes the database to be opened, a "write" to the database occurs, or the database is closed). The global settings are written to the legacy file at step 814, and the date stamp is captured and written to the new database at steps 816 and 818. Upon completing the date stamp capture at step 818, the database is ready to receive a new import and the process starts over again at step 704.

Referring to FIG. 6, the OT Configuration Library 608 provides protection and recovery if the system or database is interrupted or crashes. The support consists of the database protection available with the Configuration Library 604 with an additional export feature to restore the legacy files. When the Configuration Library 604 is executing a recovery from a system interruption or crash, the OT Configuration Library 608 hooks into the recovery process and applies the results to the legacy files using the export operation set forth in steps 802-818 of FIG. 8. Thus, the export operation commences as a result of a database recovery operation instead of the normal database close operation. Consequently, the legacy files accurately reflect any change in the database.

Execution and Use of Scripting to Configure a Computer

Figure 9:
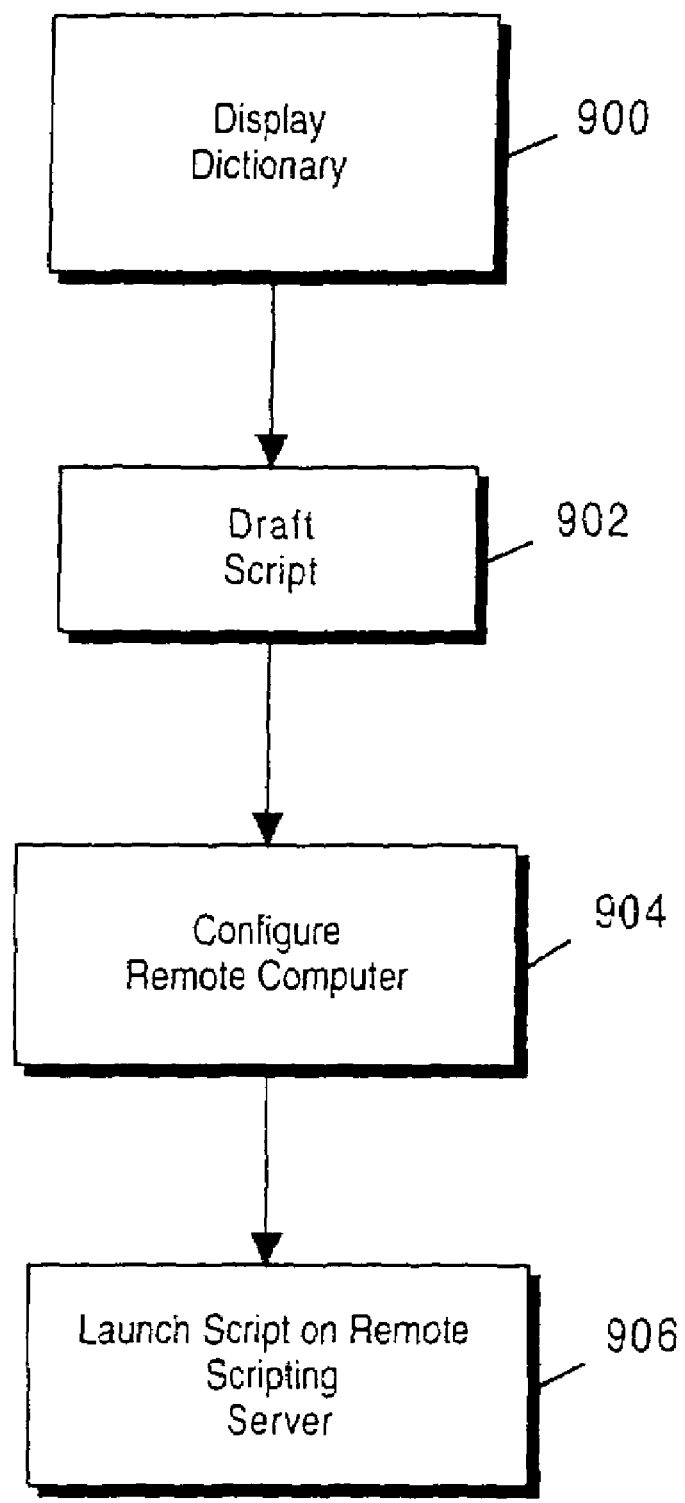
FIG. 9 illustrates a method for performing a computer configuration of one embodiment of the invention.

To utilize the database, Configuration Libraries, the Scripting Server, and Scripting Plug-Ins, a user or network administrator drafts a script. Referring to FIG. 9, at step 900 script drafting may be performed by displaying the dictionary stored in the Configuration Library associated with a particular Plug-In which enables the drafter to select the operations and fields that need to be performed or configured (the Scripting Server. may be used to display the available dictionaries to the user). At step 902 the script is drafted. The script may then be launched with a Scripting Server. To ensure that the modifications are correct, the script is run on the network administrator's own computer locally first. Subsequently, the remote computer is configured to accept remote scripting at step 904. For example, in the Macintosh environment, program sharing is turned on and the network administrator creates a user that has program sharing access. At step 906, the local script is launched on the remote computer's scripting server. The script is launched remotely merely by specifying the computer that the script is to be run on (i.e., Bob's Computer). In this manner, although the script is local, it is being launched remotely, and the database operations described in the script are performed on the remote computer's database.

Thus, a method and apparatus for configuring a computer is described in conjunction with one or more specific embodiments. The invention is defined by the claims and their full scope of equivalents.

What is claimed is:

1. A method for configuring a computer, the method comprising:

obtaining, over a network, from a server that is remote from said computer, a script having commands for configuring said computer;

parsing said script;

selecting, based on results of parsing said script, and from among a plurality of Plug-Ins, a Scripting Plug-In that maintains communication protocol-specific information that is not possessed by a Scripting Server that performs said parsing and said selecting; and forwarding said script to said Scripting Plug-In, wherein said Scripting Plug-In executes the commands to configure one or more network communication protocols of said computer.

2. The method of claim 1, wherein the Scripting Plug-In maintains knowledge of specific fields and methods of objects stored in a database.

3. The method of claim 1 further comprising:

maintaining a database containing one or more configuration setting for a computer.

4. The method of claim 3 further comprising:

mapping configuration settings having incompatible data formats into a new compatible data format for storage in said database.

5. The method of claim 1 further comprising: generating a dictionary comprising said commands for configuring a computer.

6. The method of claim 5, wherein the dictionary of the commands comprises a plurality of classes corresponding to a plurality of network protocols.

7. The method of claim 1, wherein the Scripting Plug-In notifies an operating system if changes are to be made to system settings in response to executing the commands to configure the computer.

8. A system comprising:

a scripting interface comprising a Scripting Server and at least one Scripting Plug-In, wherein said Scripting Server receives, over a network from a server that is remote from a computing machine on which said Scripting Server executes, a script having commands for configuring one or more network communication protocols of a computer, said Scripting Server parses said script to select, from among a plurality of Plug-Ins, and based on results of parsing said script, one of said at least one Scripting Plug-In that maintains communication protocol-specific information that is not possessed by said Scripting Server, wherein said one of said at least one Scripting Plug-In is configured to access said computer and modify said configuration settings.

9. The system of claim 8 further comprising:
said scripting server configured to maintain individual data, data structures, and systems associated with said plurality of network protocols.

10. The system of claim 8, wherein said each of said at least one Scripting Plug-In maintains knowledge of specific fields and methods of objects stored in a database.

11. The system of claim 8, wherein said commands are available in a dictionary.

12. The system of claim 11, wherein said dictionary comprises a plurality of classes corresponding to a plurality of network protocols.

13. The system of claim 8, wherein said Scripting Plug-In notifies an operating system when changes are to be made to system settings as a result of said configuration settings.

14. An apparatus for configuring a computer comprising:
one or more processors; and a non-volatile storage that comprises instructions for:
obtaining, over a network from a server that executes on a computing machine that is remote from said computer, a script having commands for configuring said computer;
parsing said script;
selecting, based on results of parsing said script, and from among a plurality of Plug-Ins, a Scripting Plug-In that maintains communication protocol-specific information that is not possessed by a Scripting Server that performs said parsing and said selecting; and
forwarding said script to said Scripting Plug-In, wherein said Scripting Plug-In executes said commands thereby configuring one or more network communication protocols of said computer.

15. The apparatus of claim 14 further comprising: means for maintaining a database containing one or more configuration setting for a computer.

16. The apparatus of claim 15 further comprising:
means for mapping configuration settings having incompatible data formats into a new compatible data format for storage in said database.

17. The apparatus of claim 14 further comprising: means for generating a dictionary comprising said commands for configuring a computer.

18. The apparatus of claim 17, wherein the dictionary of the commands comprises a plurality of classes corresponding to a plurality of network protocols.

19. The apparatus of claim 14, wherein the Scripting Plug-In notifies an operating system if changes are to be made to system settings in response to executing the commands to configure the computer.

20. A computer program product comprising:
a computer usable medium having computer readable code embodied therein for configuring a computer, said computer program product comprising computer readable code configured to cause a computer to:
obtain a script having commands for configuring said computer;
parse said script;
select, based on results of parsing said script, and from among a plurality of Plug-Ins, a Scripting Plug-In that maintains communication protocol-specific information that is not possessed by a Scripting Server that parses said script and selects said Scripting Plug-In; and
forward said script to said Scripting Plug-In, wherein said Scripting Plug-In executes said commands thereby configuring one or more network communication protocols of said computer.

21. The computer program product of claim 20, further comprising:
maintaining a database containing one or more configuration setting for a computer.

22. The computer program product of claim 21, further comprising:
mapping configuration settings having incompatible data formats into a new compatible data format for storage in said database.

23. The computer program product of claim 20, further comprising:
generating a dictionary comprising said commands for configuring a computer.

24. The computer program product of claim 23, wherein the dictionary of the commands comprises a plurality of classes corresponding to a plurality of network protocols.

25. The computer program product of claim 20, wherein the Scripting Plug-In notifies an operating system if changes are to be made to system settings in response to executing the commands to configure the computer.

26. The computer program product of claim 20, wherein the commands for configuring a computer include configuration settings.

27. The computer program product of claim 26, wherein the configuration settings are network configuration settings.

28. A method for configuring a computer, the method comprising:
a server transmitting a set of one or more configuration commands over a network to a set of two or more computer systems that are remote from said server;
wherein each computer system of said set of one or more computer systems contains one or more Scripting Plug-Ins;
at each particular computer system of said set of two or more computer systems, performing steps comprising:
(a) parsing said set of configuration commands; (b) selecting, based on results of said parsing, and from a plurality of Plug-Ins, a Scripting Plug-In that maintains communication protocol-specific information that is not possessed by a Scripting Server that performs said parsing and said selecting; and (c) forwarding said set of configuration commands to said Scripting Plug-In, wherein said Scripting Plug-In executes said set of configuration commands to configure said particular computer system.

29. The computer program product of claim 20, wherein said computer readable code is configured to cause said computer to obtain said script over a network from a server that is remote from said computer.

30. The method of claim 1, wherein each Plug-In of said plurality of Plug-Ins maintains information for a different communication protocol than a communication protocol for which any other Plug-In of said plurality of Plug-Ins maintains information.

* * * * *